United States Patent
Saslecov

[19]

[11] Patent Number: 6,113,132
[45] Date of Patent: Sep. 5, 2000

[54] DEVICE FOR PASSENGER PROTECTION IN A VEHICLE

[75] Inventor: Venti Saslecov, Göteborg, Sweden

[73] Assignee: Volvo Personvagnar AB, Göteborg, Sweden

[21] Appl. No.: 09/308,149

[22] PCT Filed: Dec. 4, 1997

[86] PCT No.: PCT/SE97/02025

§ 371 Date: Jun. 28, 1999

§ 102(e) Date: Jun. 28, 1999

[87] PCT Pub. No.: WO98/24661

PCT Pub. Date: Jun. 11, 1998

[30] Foreign Application Priority Data

Dec. 4, 1997 [SE] Sweden ................................ 9604466

[51] Int. Cl.$^7$ ................................................. B60R 21/22
[52] U.S. Cl. ...................................................... 280/730.1
[58] Field of Search ........................................ 280/730.1

[56] References Cited

U.S. PATENT DOCUMENTS

| | | | |
|---|---|---|---|
| 2,834,606 | 5/1958 | Bertrand | 280/730.1 |
| 3,450,414 | 6/1969 | Kobori | 280/735 |
| 3,774,936 | 11/1973 | Barnett et al. | 280/730.1 |
| 3,779,577 | 12/1973 | Wilfert | 280/730.1 |
| 5,322,322 | 6/1994 | Bark et al. | 280/730.2 |
| 5,458,367 | 10/1995 | Marts et al. | 280/730.1 |
| 5,772,238 | 6/1998 | Breed et al. | 280/730.1 |

FOREIGN PATENT DOCUMENTS

| | | |
|---|---|---|
| 4307175 | 3/1993 | Germany . |
| 19533375 | 9/1995 | Germany . |
| 1168164 | 6/1967 | United Kingdom . |
| 2290058 | 1/1995 | United Kingdom . |

Primary Examiner—Kenneth R. Rice
Attorney, Agent, or Firm—Royston, Rayzor, Vickery, Novak & Druce, L.L.P.

[57] ABSTRACT

The invention relates to a device for protecting passengers (5) in vehicles (1) with at least one seat (4) arranged in connection to the rear part of the vehicle (1), which seat is arranged so that said passenger (5) when travelling in the seat (4) faces said rear part, comprising at least one inflatable element (6; 6'), a sensor for detecting a predetermined collision-like state of the vehicle (1), and means (8) for inflating the element (6; 6') in case of said state. The invention is characterized in that said element (6; 6') in an inactive, non-inflated state is arranged in connection to said rear part and, in an active, inflated state is arranged to assume an extension between said passenger and said rear part. By means of the invention, an improved airbag device for protecting passengers in a rearwards facing extra seat in a vehicle is provided.

12 Claims, 4 Drawing Sheets

1

DEVICE FOR PASSENGER PROTECTION IN A VEHICLE

TECHNICAL FIELDS

The present invention relates to a device for protecting the passengers in a vehicle, according to the preamble of appended claim 1. In particular, the invention can be applied in connection with motor vehicles which are equipped with a backwards-facing extra seat for a passenger in the vehicle. The invention also relates to a method for protection of passengers in a vehicle, according to the preamble of appended claim 10.

BACKGROUND OF THE INVENTION

In connection with motor vehicles such as passenger cars of the station wagon kind, i.e. a vehicle which comprises a passenger compartment which is integrally shaped with a relatively large rear luggage compartment, it is known from prior art to shape this luggage compartment so that it can house an additional seat. Such an extra seat can then be arranged behind the regular rear seat, and can be so arranged that it faces backwards, i.e. so that a person in the extra seat will sit with his face towards the rear end of the vehicle, and thus have his back towards the front of the vehicle. The purpose of such an extra seat is to utilize the relatively large luggage compartment in a station wagon for transport of passengers as well, in those cases where it is not used for transporting large pieces of cargo.

According to prior art, such an extra seat normally comprises a cushion part and a back rest part which can be arranged detachably or permanently in the luggage compartment. In order to increase the flexibility of the vehicle, the extra seat can be so arranged that its cushion part can be raised when not in use.

Due to the limited amount of space which normally is available in the luggage compartment of a station wagon, the above-mentioned extra seat is normally utilized for passengers with a certain maximum body weight and length, i.e. usually for children and adolescents. A child travelling in such an extra seat is given a raised level of security as compared with, for example, if the child instead had been sitting without a safety belt in the rear seat or in the luggage compartment.

Although the above-mentioned extra seat thus provides good safety for passengers during transport, it can in connection with certain types of vehicles cause certain problems, particularly regarding protection for passengers in case of collisions or crashes. In particular, when hit from behind there is a risk that parts of the rear structure of the vehicle, for example the rear window, will be pushed into the vehicle in the direction of those sitting in the extra seat. This can of course injure the passengers, for example if the rear window hits the head or torso of the passengers, or if glass shards from the rear window hit the passengers.

In order to solve the above-mentioned problem, it has previously been attempted to reinforce the structure of the rear part of the vehicle, in order to thus prevent invasion of the luggage compartment when for example being hit from behind. In this way, it is for example possible to try to prevent the rear window of the vehicle from being pushed inwards and hitting a passenger in the extra seat. Although this in principle is an efficient way of solving the above-mentioned problem, it has limits, since it for reasons of cost and design is not possible to reinforce the structure of the body of the vehicle beyond certain limits. This in turn is due to higher demands regarding, for example, the weight of the vehicle and its fuel optimization, thus causing demands for new solutions to the said problem as an alternative to only reinforcing the structure of the vehicle which would cause an increased weight of the vehicle.

SUMMARY OF THE INVENTION

A main purpose of the present invention is thus to solve the above-mentioned problem, and to provide an improved device for protection of passengers in a rearwards facing seat in a luggage compartment of a motor vehicle. This purpose is achieved by means of a device of the initially mentioned kind, the characteristics of which will become apparent from appended claim 1. This purpose is also achieved by means of a method of the initially mentioned kind, the characteristics of which will become evident from appended claim 10.

The invention is intended to protect passengers in a vehicle which comprises a seat arranged in connection to the rear part of the vehicle in such a way that the passenger, when travelling in the seat, faces said rear part. The invention comprises at least one inflatable element, a sensor for detection of a predetermined collision-like state of the vehicle, and means for inflating the element when said condition is present. The basic principle of the invention is that said element in an inactive, not inflated state, is arranged in connection to said rear part, and in an active inflated state is arranged to assume an extension between said passenger and said rear part. In this way, efficient protection is provided for passengers in an extra seat, by means of which the passenger for example is protected against the rear window and against glass shards. A passenger in the extra seat will also be protected if he is pressed in the direction of the rear part of the vehicle in connection with, for example, being hit from behind.

By means of said inflatable element, a "curtain" is formed by the invention, which covers the rear part of the vehicle and thus forms a barrier which protects the passenger.

The inflatable elements according to the invention are in the inactive state preferably arranged as oblong, tube-like units, which are arranged essentially perpendicularly to the longitudinal extension of the vehicle, in connection to its rear part. In this way, the invention only needs small spaces in an otherwise densely packed part of the vehicle.

Further preferred embodiments will become evident from the appended dependent claims.

The terms "extra seat" and "backwards facing extra seat" in this context refer to a seat which is primarily intended for passenger cars of the station wagon kind, and is arranged for passengers which sit facing rearwards, i.e. in the direction of the rear part of the vehicle.

BRIEF DESCRIPTION OF THE DRAWINGS

The invention will in the following be described in more detail with reference to the appended drawings, in which.

PREFERRED EMBODIMENTS

Figure 1:
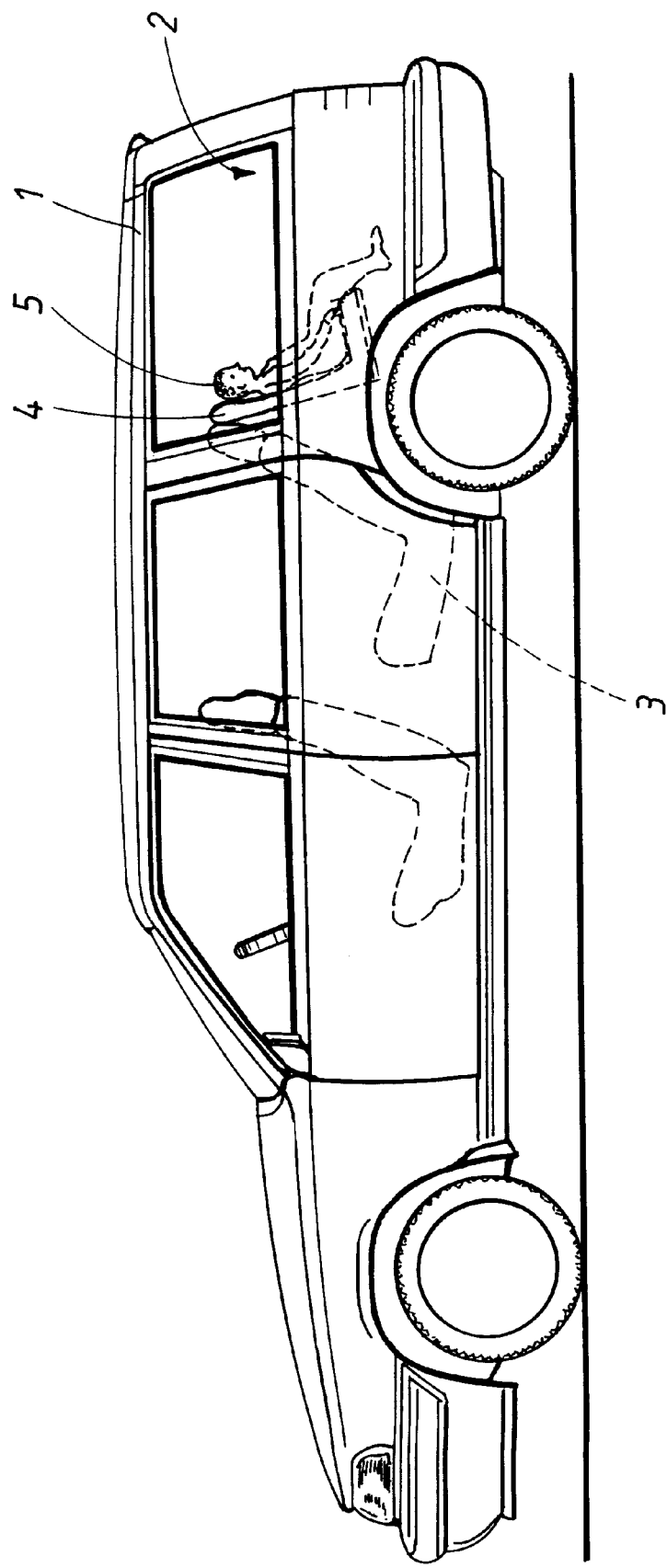
FIG. 1 is a side view of a vehicle of the station wagon kind, provided with a rearwards facing extra seat.

FIG. 1 shows a simplified side view of a motor vehicle 1 of the station wagon kind, i.e. a passenger car which is provided with a luggage compartment 2, which is integrally formed with the passenger compartment, and which in principle consists of the space behind the rear seat 3 of the vehicle 1. The invention is primarily, but not exclusively, intended for this kind of vehicle. In particular, the invention is intended for motor vehicles which according to FIG. 1 are provided with a special extra seat 4 which is arranged in the luggage compartment 2. The figure also shows the position for a passenger 5 in the extra seat 4. When the passenger 5 sits in the extra seat 4, he is thus travelling facing the rear part of the vehicle 1.

Arranging an extra seat 4 in the luggage compartment 2 is previously known, and will for that reason not be described in detail here. Due to the shape of the luggage compartment 2, the extra seat 4 is usually suitable for use only by passengers with low body weight and length, primarily children.

Figure 2:
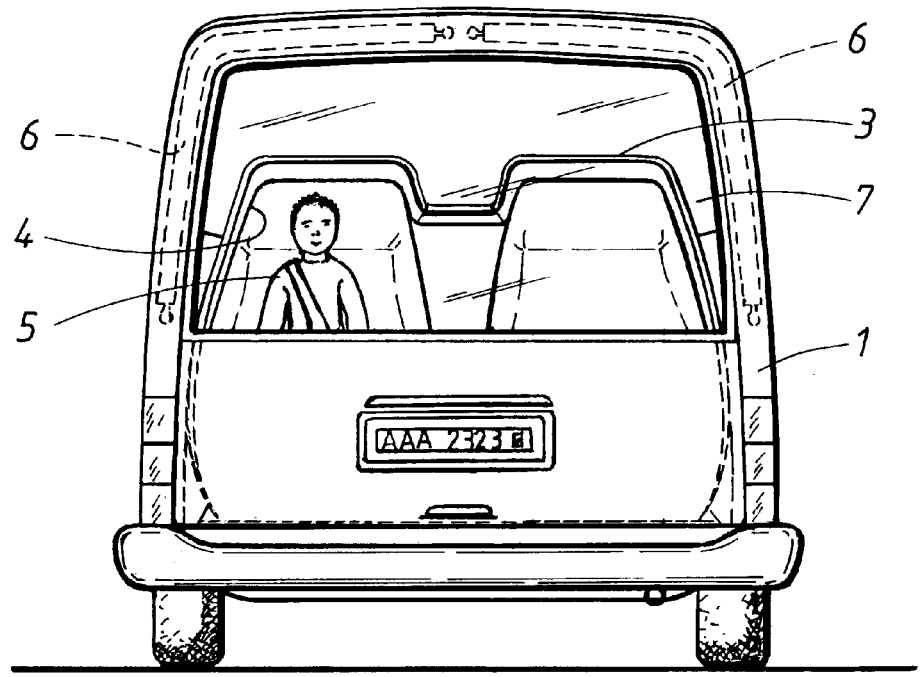
FIG. 2 is a view from behind, which shows a vehicle provided with the present invention according to a first embodiment, FIG. 3 separately shows an inflatable element intended to be used in connection with the invention.

FIG. 2 shows a view from behind of the vehicle 1 and the present invention, which according to a first embodiment consists of at least one, preferably two oblong and essentially tube-formed elements 6. These elements 6 consist of inflatable gas bags which are arranged in connection to the rear part of the vehicle 1, and which will be described in detail below. The rear part of the vehicle 1 is, in a conventional manner, provided with a rear window 7.

The figure also indicates the position for the above-mentioned extra seat 4 and a passenger 5 in the extra seat 4.

Figure 3:
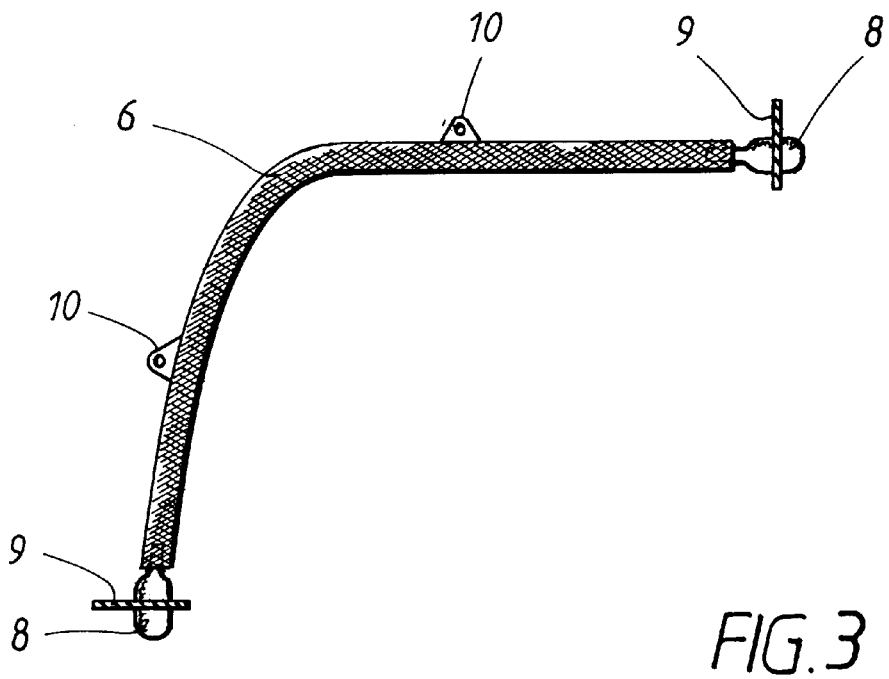

The main objective of the invention is to prevent injuries to passengers 5 in the extra seat 4 when the rear part of the vehicle 1 is compressed, for example when being hit from behind. For this purpose, each bag 6 is so arranged that it can be inflated to a position between the rear window 7 and the passenger 5. As shown separately in FIG. 3, each bag 6 is formed as a tube-like element, which preferably is made from a stretchable textile material. The bag 6 is, at least in its one end, provided with means for inflating the bag 6. These means preferably consist of a gas generator 8 which is arranged to inflate the bag 6 in the event of a collision. For this purpose, it is connected to a (not shown) acceleration sensor which, in a known manner, is arranged to detect if an abnormally high retardation takes place. If this happens, the acceleration sensor outputs a signal to the gas generator 8, which in turn is activated so that the bag 6 is inflated. According to the invention, said acceleration sensor is especially arranged to detect a state where the rear part of the vehicle 1 is exposed to an acceleration pulse which corresponds to being hit from behind by another vehicle.

Each gas generator 8 is preferably provided with an attachment element 9 for attachment to the body structure of the vehicle 1. Additionally, the bag 6 itself is preferably provided with one or several attachment elements 10 for attachment to the vehicle 1. With renewed reference to FIG. 2, each bag 6 is arranged so that its extension is along the body structure of the vehicle 1, preferably at the side of and above the rear window 7, i.e. in the upper and rear corners of the rear part of the vehicle 1. So as not to negatively influence the appearance of the interior of the vehicle 1, each bag 6 is preferably arranged behind the top and wall panels which cover the inside of the body of the vehicle 1.

Figure 4:
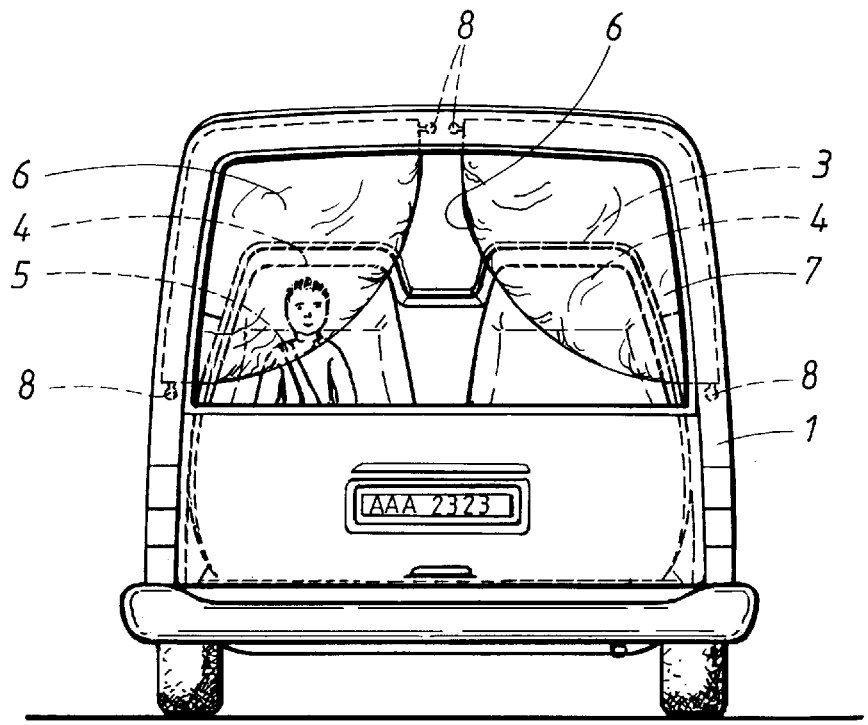
FIG. 4 is a view from behind, which corresponds to FIG. 2 but in which the device according to the invention is in an active state.

FIG. 4 shows a view from behind of the vehicle 1, which is provided with the above-mentioned bags 6, although in an active state in which the bags 6 have been inflated. When a state corresponding to a certain retardation in the rearwards direction of the vehicle 1 is detected by the above-mentioned sensor, a signal will be fed to each gas generator, which in turn will cause them to be triggered. This in turn will mean that each bag 6 will be inflated. Due to the shape of each bag 6, it will be inflated in a direction downwards and inwards, towards the middle of the vehicle, i.e. in the direction of the vertical line of symmetry of the vehicle 1. Additionally the bag 6 is arranged to assume the shape of a curtain (i.e. with a depth or thickness which is essentially smaller than its width and height) which essentially covers that area of the rear window 7 where the head and torso of the passenger 5 otherwise would have been hit by the rear window 7.

The panels in the vehicle 1 behind which each bag 6 is arranged can be provided with rupture lines or the like, in order to facilitate for each bag 6 to exit out into the passenger compartment. Alternatively, the panels can be provided with a (not shown) hatch or door, behind which each bag 6 is arranged. Such a hatch will thus be opened when the bag 6 is inflated.

Figure 5:
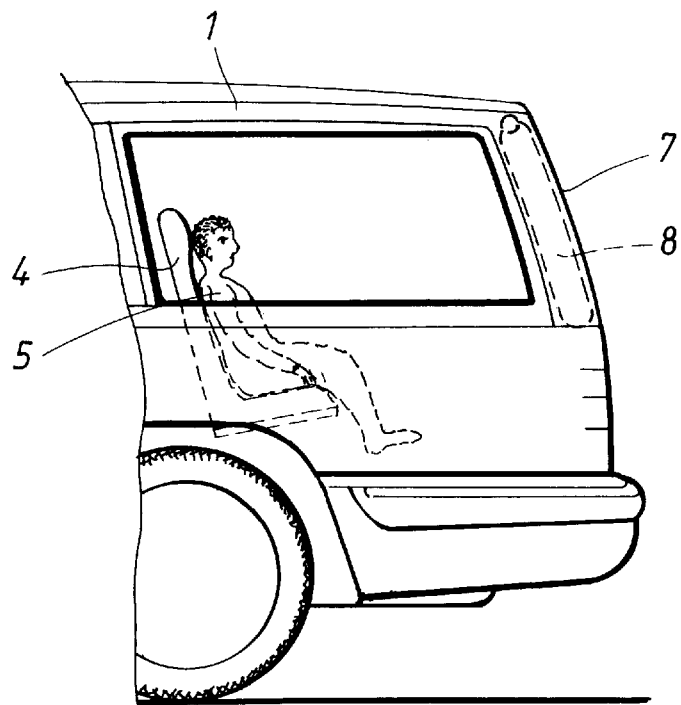
FIG. 5 is a side view of the vehicle according to FIG. 4.

FIG. 5 shows a side view of the vehicle 1 according to FIG. 4, with a bag 6 in its inflated state. From the figure, it can be seen that the bag 6 is inflated to a position just inside the rear window 7. According to the embodiment, each bag 6 is so shaped that it has a depth (i.e. seen in the longitudinal extension of the vehicle) in the order of size of about 5–8 cm, and a maximal extension from the top of the vehicle in the order of size 30–50 cm. The above-mentioned measurements can however vary according to the application.

Figure 6:
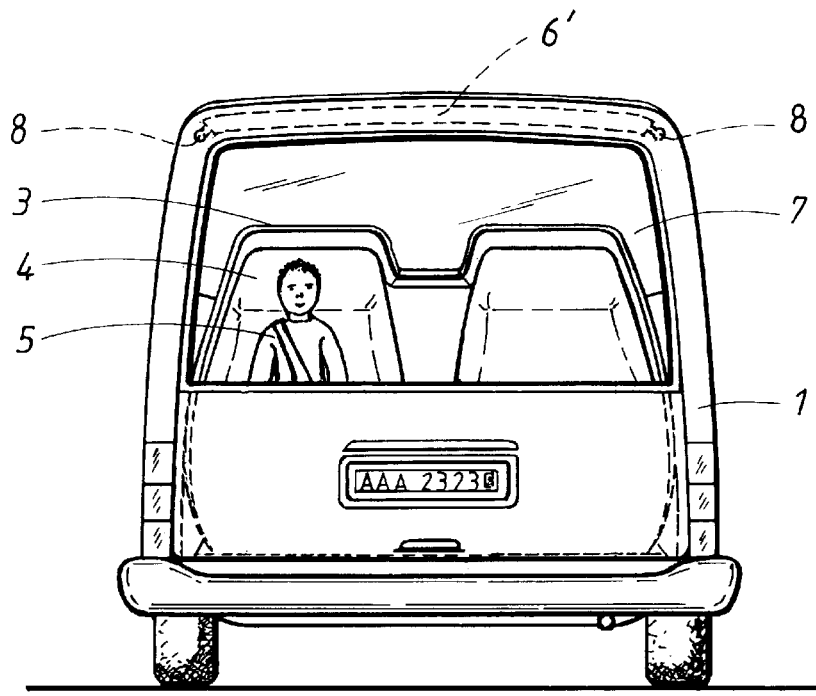
FIG. 6 is a view from behind, which shows a vehicle provided with the present invention according to a second embodiment.

FIG. 6 shows a view from behind of the invention according to a further embodiment, which comprises an oblong, essentially tube-shaped element in the form of an inflatable bag 6', which in a manner which corresponds to that described above is arranged in connection to at least one, preferably two, gas generators 8. These gas generators 8 and the bag 6' itself are fixedly attached to the body of the vehicle 1, thus giving the bag 6' an essentially horizontal extension.

Figure 7:
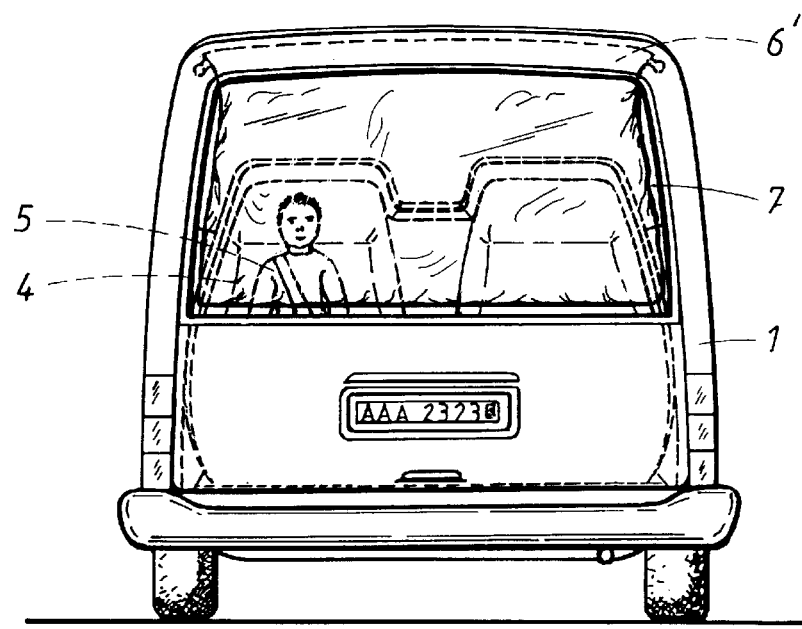
FIG. 7 is a view from behind, which corresponds to that shown in FIG. 6 but in which the device according to the invention is in an active state.

FIG. 7 shows a view from behind of the vehicle 1 according to the embodiment shown in FIG. 6, but in an active state, i.e. with the bag 6' inflated. The shape of the bag 6' is such that it is inflated in a direction which is essentially vertical from the top of the vehicle 1 and downwards. In similarity to the above-mentioned embodiment (see FIG. 4), the bag 6' is arranged to assume the shape of a curtain between the passenger 5 and the rear window 7. In a manner corresponding to that which has been shown in FIG. 5, the bag 6' has an extension from the inside of the rear window 7 and rearwards in the order of size of about 5–8 cm.

The invention is not limited to the described embodiments, but can be varied within the frame of the appended claims. The invention can, for example, be used together with an existing acceleration sensor in the vehicle 1, which can be arranged in the vehicle in order to be used together with a conventional airbag for the front seat of the vehicle 1. Such an existing sensor is then adjusted to detect collisions from behind. Alternatively, the invention can be given a separate acceleration sensor for deactivation of each gas generator 8.

The invention can be utilized in connection with a sensor which detects whether or not somebody is sitting in the extra seat 4. In this way, the bags 6, 6' can be arranged so that they are inflated only if somebody is sitting in the extra seat 4.

The invention can be utilized in different kinds of vehicles, for example station wagons which have a window with an extension along the rear of the vehicle, or in vans and buses with a rear which instead comprises a rear wall.

In a possible variant of the invention, each bag (see FIGS. 4 and 7) can be arranged for example at the lower edge of the rear window, and be arranged to be inflated in an essentially upwards direction. In yet another embodiment, the invention can comprise an inflatable bag which is arranged essentially vertically at one side of the vehicle, and which is arranged to expand, when inflated, in a direction away from the side of the vehicle, towards its opposite side. This embodiment can also comprise two inflatable bags which are vertically arranged at each side of the vehicle, and arranged to expand so that they meet at the vertical line of symmetry of the vehicle.

What is claimed is:

1. A device for protection of passengers in vehicles with at least one seat arranged in connection to the rear part of the vehicle, which seat is arranged so that said passenger, when travelling in the seat, faces said rear part, comprising at least one inflatable element, a sensor for detecting a predetermined collision-like state of the vehicle and means for inflating the element in case of said state, wherein said element in an inactive, non-inflated state is arranged in connection to the two upper and rear corners of the body structure of the vehicle, where in the element in an active, inflated state is arranged so as to expand away from said corners in a direction towards the vertical line of symmetry of the vehicle, thereby assuming a position between said passenger and said rear part.

2. The device according to claim 1,
wherein said rear part comprises a rear window, and wherein said element is fixedly attached to the body structure of the vehicle, said active state constitutes a curtain between said passenger and said rear window.

3. The device according to claim 1,
wherein said element is arranged, when inflated, to expand in a direction which is essentially perpendicular to the longitudinal extension of the vehicle.

4. The device according to claim 1,
wherein said element in its inactive state comprises an essentially tube-shaped component, with said means for inflation being connected to at least one end part of said element.

5. A device for protection of passengers in vehicles with at least one seat arranged in connection to the rear part of the vehicle, which seat is arranged so that said passenger, when travelling in the seat, faces said rear part, comprising at least one inflatable element, a sensor for detecting a predetermined collision-like state of the vehicle and means for inflating the element in case of said state, wherein said element in an inactive non-inflated state is arranged in connection to said rear part, and in an active inflated state is arranged to assume an extension between said passenger and said rear part.

6. The device according to claim 5,
further comprising an inflatable element, arranged with an essentially horizontal extension in connection to said rear part, with the element in said active state expanding in an essentially vertical direction.

7. The device according to claim 6,
wherein said inflatable element is arranged to expand in an upwards direction, alternatively in a downwards direction, along said rear part.

8. The device according to claim 5,
further comprising at least one inflatable element arranged with an essentially vertical extension in connection to said rear part, with said element being arranged to expand in said active state in an essentially horizontal direction from the side of the vehicle.

9. A device for protecting passengers in a vehicle of the station wagon kind which comprises a seat arranged in the luggage compartment of the vehicle, which seat faces rearwards, with said passengers, when travelling in the seat, thus facing the rear end part of the vehicle, comprising at least one inflatable element, a sensor for detecting a predetermined collision-like state of the vehicle, and means for inflating said element in case of said state, wherein said element in an inactive, non-inflated state, is arranged in connection to said rear end part, and in an active inflated state is arranged to assume an position between said passenger and said rear end part, thereby forming a curtain having a thickness which is considerably smaller than its width and length.

10. A method for protecting passengers in vehicles with at least one seat arranged in connection to the rear part of the vehicle, said seat being arranged so that said passenger when travelling in the seat faces said rear part, and at least one inflatable element, comprising detecting a predetermined collision-like state of the vehicle and inflating the element in case of said state, wherein said inflation of the element is controlled so that the element expands away from the two upper and rear corners of the body structure of the vehicle and in a direction towards the vertical line of symmetry of the vehicle, the element thereby assuming a position between said passenger and said rear part.

11. The method according to claim 10,
wherein said inflation of the element takes place in a direction which is essentially perpendicular to the longitudinal extension of the vehicle.

12. The method according to claim 10,
wherein said detection relates to a state which corresponds to a predetermined retardation in the rearwards direction of the vehicle.

* * * * *